No. 649,177. Patented May 8, 1900.
E. C. REGLI.
COMBINED CARRIAGE AND SLEIGH.
(Application filed Feb. 20, 1900.)
(No Model.)
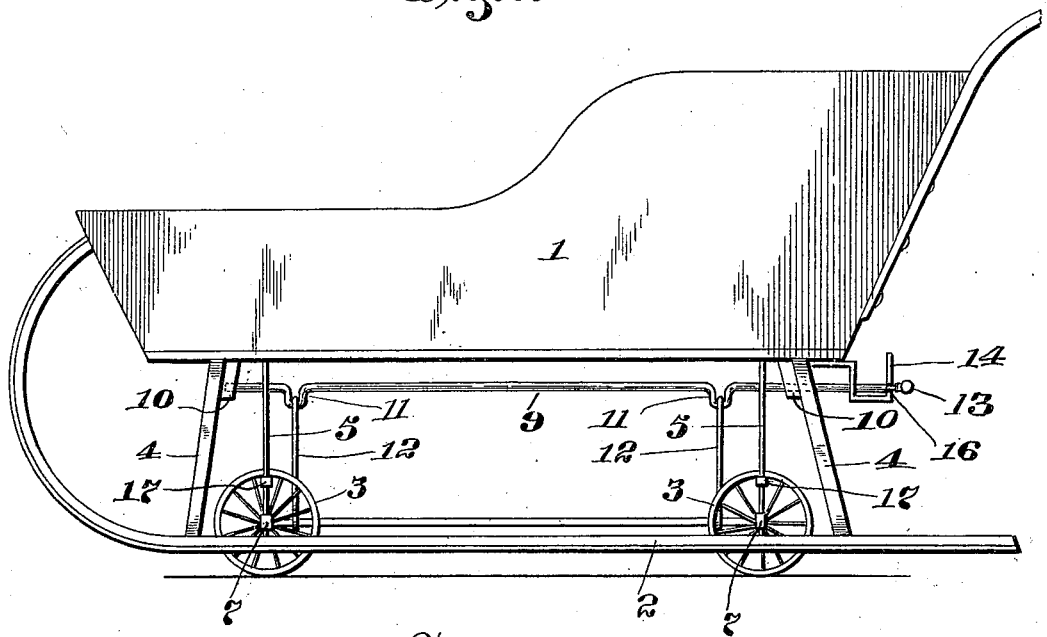
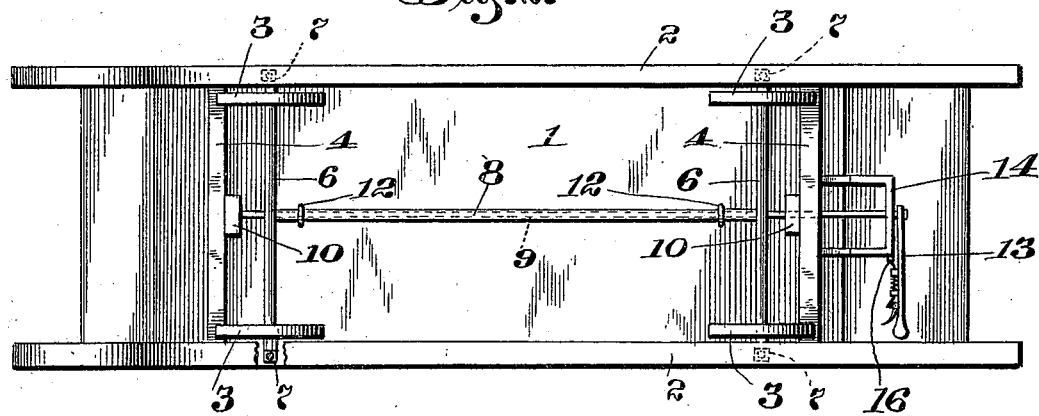
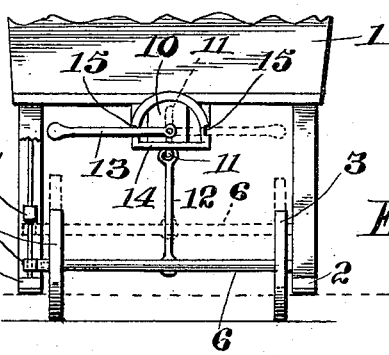
Witnesses
Marcus L. Byng.
Esther V. Byng.
Inventor
Edward C. Regli
His Attorneys
THE NORRIS PETERS CO., PHOTO-LITHO., WASHINGTON, D. C.

UNITED STATES PATENT OFFICE.

EDWARD C. REGLI, OF DULUTH, MINNESOTA.

COMBINED CARRIAGE AND SLEIGH.

SPECIFICATION forming part of Letters Patent No. 649,177, dated May 8, 1900.

Application filed February 20, 1900. Serial No. 5,923. (No model.)

*To all whom it may concern:*

Be it known that I, EDWARD C. REGLI, a citizen of the United States, residing at Duluth, in the county of St. Louis and State of Minnesota, have invented certain new and useful Improvements in a Combined Carriage and Sleigh; and I do hereby declare the following to be a full, clear, and exact description of the invention, such as will enable others skilled in the art to which it appertains to make and use the same.

My invention relates to improvements in combined carriages and sleighs, and particularly to that type of vehicles which are changeable from one into the other, and vice versa, and may be of any desired dimensions.

The invention consists of a vehicle having a suitable body portion, runners secured thereto, wheels mounted beneath the said body portion, vertical guides for directing the movement of the wheels, and improved means for raising and lowering the wheels to change the vehicle from a carriage to a sleigh, or vice versa, the construction, arrangement, and combination of the various parts being hereinafter fully described, and afterward specifically pointed out in the claims.

In the accompanying drawings, Figure 1 represents a side elevation of a vehicle constructed in accordance with my invention. Fig. 2 represents a bottom plan view of the same, and Fig. 3 a rear elevation of a portion of the said vehicle.

1 in the drawings represents a vehicle-body, 2 runners secured thereto, and 3 3 wheels movably attached to the vehicle.

My invention is designed to provide a vehicle which may be used with supporting-wheels when desired and may be quickly changed so as to move upon runners when the vehicle is passing over snow or ice. In embodying these features in a practical form I preferably mount the runners 2 2 rigidly upon the under side of the body 1, securing them thereto by means of arches 4 4 or any suitable trusses or supports. Upon each side of the vehicle I mount vertical guide-rods 5 5, the said guide-rods being secured at their upper ends to the bottom of the body 1 and at their lower ends to the runners 2 2. The wheels 3 3 are provided with axles 6 6, and sleeve-nuts 7 7 are secured to the outer ends of the said axles outside the hubs of the wheels. These nuts are screwed upon the ends of the axles, and their sleeve portions are placed upon the guide-rods 5 5, so as to be capable of sliding up and down upon the same. The axles 6 6 are preferably connected by a rod, as 8, which extends from the central portion of one axle to the central portion of the other. Above the rod 8 and in suitable proximity to the bottom of the body 1 is a crank-shaft 9, which is journaled at its end in bearings 10 10, secured to the arches 4 or to a block or other suitable support secured to the bottom of a sleigh-body. The crank-shaft 9 is provided with two or more cranks, as 11 11, which are connected with the rod 8 by means of suitable pitmen 12 12. The pitmen 12 12 preferably engage the rod 8 at points near the axles 6 6, so as to easily raise the same without twisting or binding the parts. The rear end of the crank-shaft 9 extends a suitable distance to the rear of the body 1 and is provided with an operating handle or lever 13, by which it may be turned. A segment, as 14, may be secured to the body 1 and is provided with suitable notches, as 15 15, for locking the handle 13 in its adjusted positions. The handle 13 may be provided with the usual spring-pressed pawl 16 for engaging the said notches 15. The upward movement of the sleeve-nuts 7 7 is preferably limited by means of enlargements or sleeves 17, secured to the vertical guide-rods 5, so that when the wheels are in their raised positions they cannot sway up and down. This is desirable, as the rocking of the axles might be objectionable when using the vehicle as a sleigh.

In using the vehicle with the wheels as the supporting means the crank-shaft is turned so that its cranks are in their lowest positions, as seen in Figs. 1 and 3 of the drawings. By giving the crank-shaft a half-turn, as indicated in dotted lines in Fig. 3, the cranks will be moved to their highest position and the wheels will be lifted out of engagement with the ground or other surface upon which the vehicle is moving. This will leave the body portion 1 supported upon its runners 2 and ready for use as a sleigh. It will be evident that any means other than the segment 14 might be employed for holding the crank-shaft in its altered positions without departing from the spirit of the invention, and also that other minor changes might be made in the parts, if desired.

It will be apparent from the above description that my improved combined sleigh and carriage is of simple construction and yet can be easily and quickly manipulated to change it from one style of vehicle to the other, and especially desirable for use in passing bare places in a snow-covered road.

Having now described my invention, what I claim, and desire to secure by Letters Patent, is—

1. In a convertible vehicle, the combination with a body, and sleigh-runners connected thereto, of suitably-journaled wheels, a longitudinal cranked shaft mounted under the body, connections between the cranks of the longitudinal shaft and the wheels, and means for rotating the longitudinal shaft, whereby the wheels may be raised or lowered, substantially as described.

2. In a convertible vehicle, the combination with a body, and sleigh-runners connected thereto, of axles, wheels journaled thereon, a longitudinal cranked shaft mounted under the body, connections between the cranks of the longitudinal shaft and the axle, and means for rotating the longitudinal shaft, whereby the wheels and axles may be raised or lowered, substantially as described.

3. In a convertible vehicle, the combination with a body, and sleigh-runners attached thereto, of axles, wheels journaled on said axles, a longitudinal bar connecting the axles, a longitudinal cranked shaft beneath the body, pitmen connecting the cranked longitudinal shaft to the axles, and means for rotating the longitudinal shaft, whereby the wheels and axles may be raised or lowered, substantially as described.

4. In a combined carriage and sleigh, the combination with a body portion, of runners secured thereto by suitable arches, vertical guide-rods interposed between the body portion and the sleigh-runners, wheels mounted beneath the body portion, axles carrying the said wheels, sleeve-nuts upon the ends of the said axles and inclosing the said guide-rods so as to be capable of sliding thereon, means connecting the axles and a crank-shaft connected with the said means, and journaled beneath the body portion, the construction being such that upon rotating the crank-shaft the wheels may be raised or lowered for changing the vehicle from a carriage to a sleigh, substantially as described.

5. In a combined carriage and sleigh, the combination with a suitable body portion having runners mounted thereon, a frame mounted beneath the body portion comprising front and rear axles, a rod connecting the same, wheels carried by the said axles, vertical sleeves secured to the ends of the axles, guide-rods engaging the said sleeves and secured between the body portion and the runners, stops upon the said guide-rods for preventing the wheel-frame from swaying, a crank-shaft mounted in suitable journal-bearings beneath the body portion having two or more cranks, pitmen connecting the cranks with the wheel-frame, a lever or handle secured to the crank-shaft and means for locking the said handle in adjusted positions, the construction being such that by giving the shaft a half-turn in one direction, the wheels will be lowered to support the vehicle, and by giving the crank-shaft a half-turn in the other direction, the wheels may be raised and the vehicle permitted to rest upon the sleigh-runners, substantially as described.

In testimony whereof I hereunto affix my signature in presence of two witnesses.

EDWARD C. REGLI.

Witnesses:
JAMES T. WATSON,
PHINEAS AYER.